Figure 1:
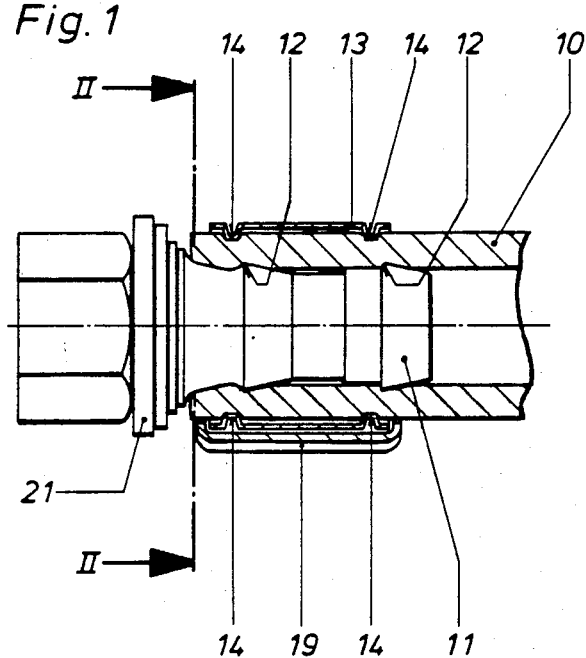

United States Patent [19]

Weinhold

[11] Patent Number: 4,556,241
[45] Date of Patent: Dec. 3, 1985

[54] DEVICE TO CONNECT HOSE OR PIPE ENDS

[76] Inventor: Karl Weinhold, 4040 Neuss, Im Jagdfeld 43, Fed. Rep. of Germany

[21] Appl. No.: 495,161

[22] Filed: May 17, 1983

[30] Foreign Application Priority Data

May 19, 1982 [DE] Fed. Rep. of Germany ....... 3218965

[51] Int. Cl.⁴ .............................................. F16L 33/12
[52] U.S. Cl. ..................... 285/244; 285/252; 285/365; 285/407; 285/409
[58] Field of Search ............... 285/252, 244, 409, 407, 285/365, 406, 364

[56] References Cited

U.S. PATENT DOCUMENTS

| 411,130 | 9/1889 | Robinson | 285/409 |
|---|---|---|---|
| 489,784 | 1/1893 | Bibb | 285/409 |
| 936,627 | 10/1909 | Hill | 285/252 X |
| 941,150 | 11/1909 | Johnson | 285/252 |
| 2,226,936 | 12/1940 | Markey | 285/409 X |
| 2,331,132 | 10/1943 | Nadelson . | |
| 2,649,632 | 8/1953 | Kessler . | |
| 3,441,655 | 4/1969 | Turner . | |
| 3,979,143 | 9/1976 | Weinhold | 285/409 X |
| 4,272,871 | 6/1981 | Weinhold | 285/409 X |

FOREIGN PATENT DOCUMENTS

| 1969400 | 9/1967 | Fed. Rep. of Germany . | |
|---|---|---|---|
| 2611175 | 9/1977 | Fed. Rep. of Germany . | |
| 2810589 | 9/1979 | Fed. Rep. of Germany | 285/252 |
| 1031403 | 6/1966 | United Kingdom | 285/252 |

*Primary Examiner*—Richard J. Scanlan, Jr.
*Attorney, Agent, or Firm*—Spencer & Frank

[57] ABSTRACT

The invention relates to a device to connect hose or pipe ends. Until now such a device comprised at least two non-deformable clamp parts with flanges extending inwards which serve to press a hose end onto a nozzle or which engage behind annular collars provided at the ends of the pipes. At the ends facing one another the clamp parts are provided with a mounting arrangement for a hinge-pin which connects these parts. To avoid the work entailed by providing such a mounting arrangement and by the assembling of a number of clamp parts, it is proposed according to the invention that the clamp-type ring is made as one piece and is produced of a material which can be deformed by hand and that the flanges are formed by a permanent shaping of the ring. In this way a far more inexpensive construction is obtained, which also has the advantage of a lower mass and requires less space.

9 Claims, 6 Drawing Figures

DEVICE TO CONNECT HOSE OR PIPE ENDS

The invention relates to a device to connect hose or pipe ends, comprising a clamp-like ring which encircles the hose or pipe end in use and is provided with flanges extending inwardly which serve to press a hose onto a nozzle or which engage behind annular collars provided at the end of a pipe, and comprising a clamping lever fastener which, when the device is closed, connects the ends of the ring, the clamping lever engaging onto the one end and having a spring which engages onto the other end of the ring.

With a known device of this type the clamp-like ring consists of two or more non-deformable clamp parts, which, at the ends facing one another, are connected by means of a hinge pin. After opening the clamping lever fastener the clamp parts are hinged open, so that a hose can be pulled off a nozzle or two pipe ends can be separated.

Part of the work required to produce such a device results, therefore, from the necessity to provide arrangements at the ends of the clamp parts facing one another for the mounting of the hinge pin, and furthermore the clamp parts must be put together by inserting the hinge pin.

It is the aim of the present invention to reduce the work required to produce such a device.

To achieve this aim, it is proposed according to the invention that the clamp-like ring is provided in one piece and is made of material which can be deformed by hand, and that the flanges are formed by a permanent shaping of the ring.

With this arrangement, it is no longer necessary to produce a number of clamp parts and to provide mounting arrangements for the hinge pin at the ends of the clamp parts facing one another. Also, the work previously required for assembling the clamp parts falls away, so that the device can be produced far more economically. Since the device consists of only one part, it is also easier to handle. A further advantage lies in the reduction of the mass of the device. Furthermore less space is required.

According to the invention it is advantageous that the flanges, when the device is closed, form in the region of their inside diameter surfaces which are at least approximately concentric to the outer surface of the hose or pipe end, and the flange cross-section extends at least roughly in the shape of a truncated triangle.

When pressing a hose onto a nozzle with the aid of the proposed device, due to the fact that the flanges lie flat on the hose, damages to the hose can be prevented.

The clamp-like ring may be made of a plastically deformable material, e.g. of a material which after a corresponding bending retains its respective shape. Either a metallic material or a suitable plastic material may be used.

It is, however, particularly advantageous when the ring is made of spring steel. In that case it is elastically deformable. This elasticity facilitates the handling and also renders possible a quicker opening of the device after the clamping lever fastener is released.

In a further embodiment of the invention it is proposed that the flanges are provided with extensions which project beyond one end of the ring, and that the extensions engage into flange cross-sections provided at the other end of the ring.

This results in a form-locking guidance between the two ring ends in the axial direction. During the closing of the device the ring ends are prevented from assuming a position which is out-of-line in the axial direction.

In this connection it is furthermore advantageous when the extensions of the flanges are provided at that end of the ring on which the spring of the clamping lever fastener engages. This is particularly favourable for the closing function.

Furthermore the extensions of the flanges can according to the invention taper down in the peripheral direction. This facilitates the pushing together of the ring ends. It is also advantageous when the extensions of the flanges at one end of the ring widen out in the axial direction along line IV—IV of FIG. 5 of the device and during the closing of the device engage under the flanges provided at the other end of the ring.

The spring of the clamping lever fastener will advantageously engage onto a lug punched out and bent outwards in the region of one end of the ring.

Figure 2:
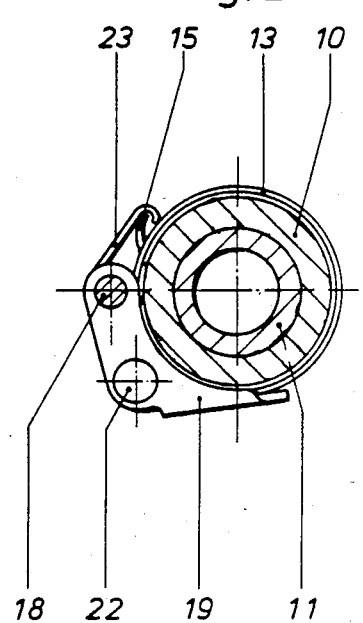
Figure 3:
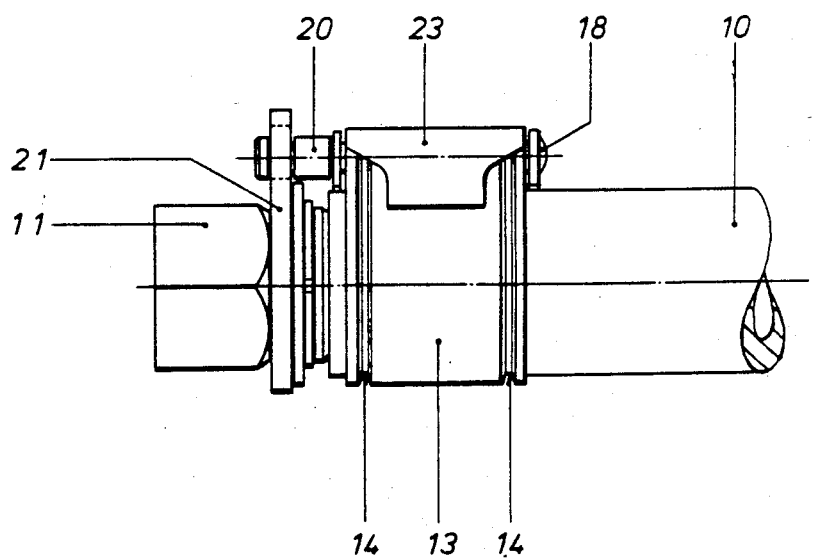
Figure 4:
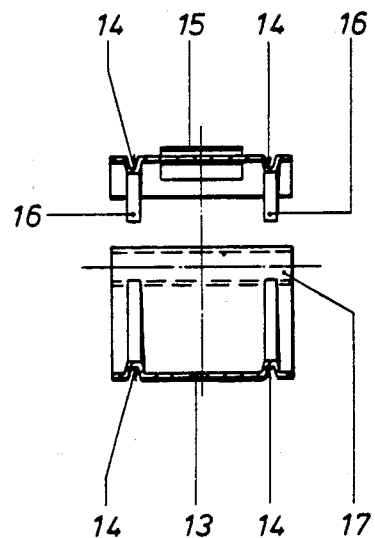
Figure 5:
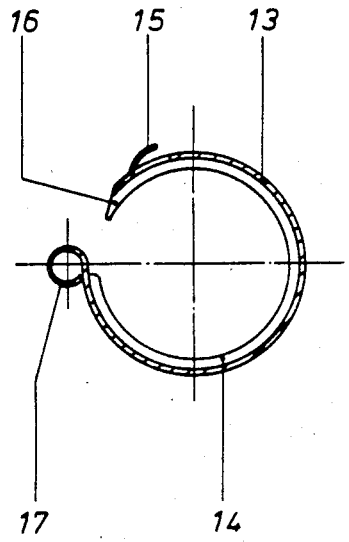
Figure 6:
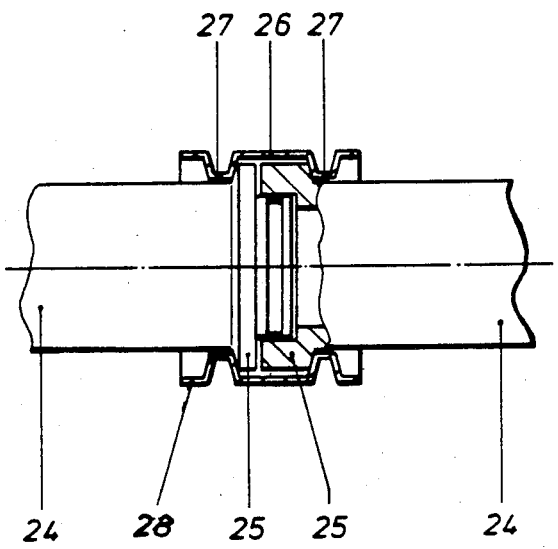
Figure 7:
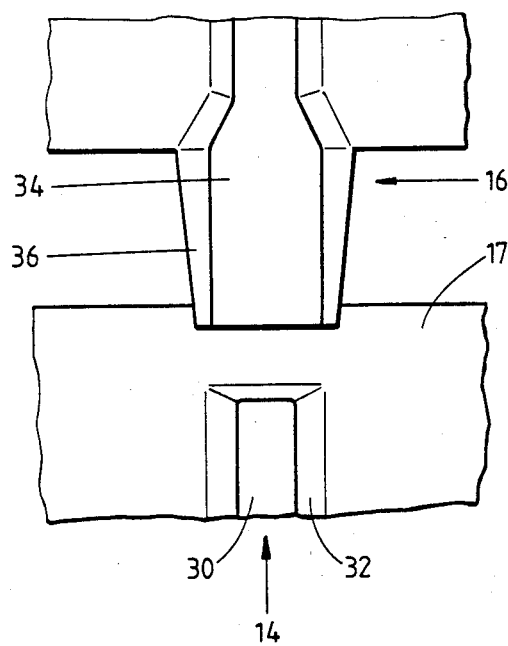

In the following an exemplified embodiment of the invention will be explained in greater detail with reference to the drawing. Shown are:

FIG. 1 a longitudinal section through a first embodiment of the device in the form of a hose fastener;

FIG. 2 a cross-section through the device along line 11—11 in FIG. 1;

FIG. 3 a view of the device of FIG. 1 from a direction turned by 90° compared to the view shown in FIG. 1;

FIG. 4 a cross sectional view of the ring, seen in the radial direction;

FIG. 5 the ring shown in FIG. 4, seen in the axial direction;

FIG. 6 in a diagrammatic representation a modified embodiment of the device for connecting two pipe ends.

The embodiment shown in FIGS. 1 to 5 serves to fasten a hose end 10 to a nozzle 11. This nozzle 11 has beads 12 arranged at an axial distance from one another and formed by corresponding increases in the cross-sectional area.

The device consists of a ring 13 made of spring steel with two flanges 14 extending around the periphery of roof 13 and projecting inwardly. The flanges 14 each have a cross-section in the shape of a truncated triangle, or a trapezoid, which is such that the narrower part of the flange facing inwards forms a cylindrical contact surface which extends approximately parallel to the longitudinal axis of the nozzle 11. At the same time each of the flanges 14 forms an annular groove which is open to the outside. The axial locations of the flanges 14 are chosen in such a manner that when the device is closed each flange 14 presses the hose end 10 onto the nozzle 11 directly behind a bead 12. This results in a good sealing effect.

A lug 15 is punched out of the ring 13 in the region of one of its ends, and is bent outwardly. At the same end the flanges 14 form extensions 16 which taper down in the peripheral direction as shown in FIG. 5. Furthermore the cross-section of the extensions 16 becomes wider compared to that of the flanges 14, so that when the ring ends are pushed together the extensions 16 can engage under the flange cross-sections of the opposite ring end. The latter is rolled up outwardly into a bush 17.

Through the bush 17 there extends a hinge pin 18 to which a clamping lever 19 is fastened in an articulated manner. In the axial direction the hinge pin 18 extends beyond the zone of ring 13 and passes through a spacer sleeve 20 and a disc-shaped holder 21. The hinge pin 18 is fixed in the axial direction in this holder 21. The holder 21 is in turn put onto that part of the nozzle 11 which is not required for pushing on the hose end, which part is provided in the form of a screw connection. By way of the holder 21 the device is connected to the nozzle 11 in such a manner that it cannot get lost.

One end of a spring 23 is fastened to the clamping lever 19 by means of a further hinge pin 22. The other end of the spring 23 is bent into the shape of a hook and when the device is closed engages around the lug 15. In this way, by closing the clamping lever 19 the ends of the ring can be pulled together.

The embodiment of the device shown in FIG. 6 serves to connect two pipe ends 24, each of which ends is provided with an external annular collar 25, and which ends are fitted into one another. The device comprises a ring 26 which is provided with flanges 27. When the device is closed these engage behind the annular collar 25. The clamping lever fastener is not shown.

As can furthermore be noted each flange 27 is provided on its side wall facing the outside of the device with an external annular edge 28, which increases the stability. The annular edge 28 is cylindrical and has the same diameter as the ring 26. This renders possible a particularly simple and expedient manufacture when the flanges 27 are formed by a corresponding rolling-out of the ring material.

I claim:

1. A device to connect hose or pipe ends, comprising a clamp-like ring which encircles the hose or pipe end in use and is provided with flanges extending inwardly which serve to press a hose onto a nozzle or which engage behind annular collars provided at the end of a pipe, and comprising a clamping lever fastener which, when the device is closed, connects the ends of the ring, the clamping lever engaging onto one end of the ring and having a spring engagable with the other end of the ring, wherein the clamp-like ring is provided in one piece and is made of a material which can be deformed by hand, and in that the flanges are formed by a permanent shaping of the ring, the flanges are provided with extensions which project beyond one end of the ring, and the extensions engage, in use, portions of the flanges provided at the other end of the ring.

2. A device according to claim 1, wherein the flanges each form an annular groove which is open to the outside.

3. A device according to claim 1, wherein each side wall of a flange facing the outside of the device has connected to it an annular edge extending in the axial direction.

4. A device according to claim 1, wherein the flanges, when the device is closed, form in the region of their inside diameter, surfaces which extend at least approximately concentric to the outer surface of the hose or pipe end, and the flange cross-section is at least roughly in the shape of a truncated triangle.

5. A device according to claim 1, wherein the ring is made of spring steel.

6. A device according to claim 1, wherein the extensions of the flanges are provided at that end of the ring onto which the spring of the clamping lever fastener engages.

7. A device according to claim 1, wherein the extensions of the flanges taper down in the peripheral direction.

8. A device according to claim 1, wherein the extensions of the flanges widen out in the axial direction of the device and during the closing of the device engage under the portions of the flanges provided at the other end of the ring.

9. A device according to claim 1, wherein, in the region of one end of the ring, a lug is punched out which is bent outwardly and onto which the spring of the clamping lever fastener engages in use.

* * * * *